United States Patent [19]

Pagliuca

[11] Patent Number: 5,050,033

[45] Date of Patent: Sep. 17, 1991

[54] BACK-UP SURGE ARRESTERS

[75] Inventor: Emanuel J. Pagliuca, Patchogue, N.Y.

[73] Assignee: TII Industries, Inc., Copiagne, N.Y.

[21] Appl. No.: 657,074

[22] Filed: Feb. 19, 1991

[51] Int. Cl.[5] .............................................. H02H 9/04

[52] U.S. Cl. .................................... 361/119; 361/120; 361/129

[58] Field of Search ................................ 361/117-120, 361/124, 129, 130; 337/28, 29

[56] References Cited

U.S. PATENT DOCUMENTS

| | | | |
|---|---|---|---|
| 4,340,923 | 7/1982 | Bazarian et al. | 361/120 |
| 4,866,562 | 9/1989 | Jones | 361/119 |

*Primary Examiner*—Todd E. Deboer
*Attorney, Agent, or Firm*—Sachs & Sachs

[57] ABSTRACT

A back-up surge arrester is combined with a conventional gas filled surge arrester in axial alignment. The size of the air gap is held to a predetermined distance by aid of the mechanical configuration specified herein and further includes a heat sensitive material in a parallel breakdown path.

8 Claims, 3 Drawing Sheets

BACK-UP SURGE ARRESTERS

BACKGROUND OF THE INVENTION

1. Field of the Invention

The present invention relates to back-up air gap surge arresters, and more particularly, to an apparatus for providing a thermally sensitive breakdown path, a parallel back-up air gap surge arrester adapted to be affixed to a gas filled surge arrester in order to provide protection for telephone equipment from electrical overload.

2. Discussion of the Relevant Art

Numerous devices have been used to protect communication lines, such as those utilized by telephone companies and the like to protect against electrical overloads by surge arresters which are connected between the line and ground. The old carbon block surge arresters which were in use for many years have been replaced with gas filled surge arresters which comprise a pair of electrodes separated by an air gap maintained in a gas filled atmosphere. With a lightning strike, for example, or a voltage overload, the gap between the electrodes is bridged temporarily is dissipated. In this manner, electrical circuits connected to telephone lines are protected.

The electrodes of gas filled surge arresters are commonly spaced 40 mils apart, as compared to the 3 mils of air gap space in a carbon block surge arrester. However, the gas at a subatmospheric pressure, is permanently sealed within the ceramic insulator surrounding the electrodes and imparts the electrical design characteristic to the device.

The DC breakdown voltage of a typical gas filled surge arrester is approximately 400 volts. However, should the sealed ceramic insulated tube become broken, permitting an air leak between the electrodes, the DC breakdown voltage of the gas filled surge arrester, now vented to the air becomes considerably higher, in the vicinity of 33,500 volts. This breakdown voltage is much too high to adequately protect the communication circuits. For this reason, telephone companies have required that a back-up or alternative air gap type surge arrester be installed in parallel with the gas filled surge arrester. An air gap surge arrester having a 3 mil gap spacing typically has a DC breakdown voltage of approximately 600 to 1000 volts. Thus, the combination of different types of arresters in parallel assures that the DC breakdown voltage will never exceed that of the air gap surge arrester, should the gas within the surge arrester escape.

Many different configurations have been utilized to accomplish a back-up surge protector such as the type which utilize an insulator having apertures provided therein so that the air gap has a length of approximately the thickness of the insulator and serves as a second arrester to provide the back-up protection. This configuration can produce an assembly which fits into the standard retaining cup, however it does not prove adequate to meet the electrical performance specifications desired by the telephone companies.

Another approach to the problem is disclosed in U.S. Pat. No. 4,340,923 issued to A. Bazarian, et al on July 20, 1982. The configuration disclosed therein provides an additional electrode and a ceramic washer with a predetermined air gap placed therein. However, this device is not readily assembled and requires precise assembly technique.

Therefore, it is an object of the present invention to overcome the shortcomings of the prior art and provide a back-up air gap surge arrester which may be readily assembled and tested and thereafter affixed to a conventional gas surge arrester.

It is another object of the present invention to provide a circuit protector wherein the gas filled and air gap surge arrester share a common electrode.

It is still a further object of the present invention to provide a circuit protector which includes an air gap as well as a thermally sensitive insulator capable of protecting a circuit for overvoltage and overheating.

SUMMARY OF THE PRESENT INVENTION

In accordance with the present invention, an apparatus is provided which protects the circuit from an electrical overload. The apparatus is suitable for use with a conventional arrester having at least one electrically conductive electrode provided with a dimpled recess therein and comprises, in combination; an elongated rivet having two ends, one end thereof is adapted to be received into and in electrically conductive contact with the one electrode of the surge arrester having the dimpled recess. A collar, disposed remote from the rivet one end, provides a flat surface circumferentially disposed around the elongated rivet facing away from the one end. A first generally flat insulator has a centrally disposed aperture with a diameter generally equal to the diameter of the rivet and is disposed upon the flat surface of the collar. A cupped washer has a flat portion and an extending portion and is disposed generally perpendicular to the washer flat portion. The extending portion faces away from the one end of the rivet, the washer flat portion is provided with an aperture having a diameter greater than the rivet diameter. The washer flat portion and the arrester dimpled electrode sandwich the first insulator therebetween. A second flat insulator has a circumferential diameter generally equal to the diameter of the cupped washer flat portion and a centrally disposed aperture where the diameter is generally equal to the rivet diameter and is adapted to be received and cooperate with the flat portion of the cupped washer. A locking washer has a tapered portion and a flat portion, the flat portion and the cupped washer flat portion sandwich the second insulator therebetween. The locking washer tapered portion has an aperture adapted to be force fit and frictionally held upon the rivet second end, which is in electrically conductive contact with the rivet. The locking washer forces and retains the first and second insulators and the cupped washer against the rivet collar.

The foregoing and other objects and advantages will appear from the description to follow. In the description reference is made to the accompanying drawing which forms a part hereof, and in which is shown by way of illustration and specific embodiments in which the invention may be practiced. These embodiments will be described in sufficient detail to enable those skilled in the art to practice the invention and it is to be understood that other embodiments may be utilized and that structural changes may be made without departing from the scope of the invention. The following detailed description is, therefore, not to be taken in a limiting sense and the scope of the present invention is best defined by the appended claims. Like reference characters have been utilized to designate like or corresponding components in the alternative embodiment of the invention in order for the reader to better understand the invention.

DESCRIPTION OF THE DRAWING

In order that the invention may be more fully understood, it will now be described, by way of examples, with reference to the accompanying drawing in which.

DESCRIPTION OF THE PREFERRED EMBODIMENTS

Figure 1:
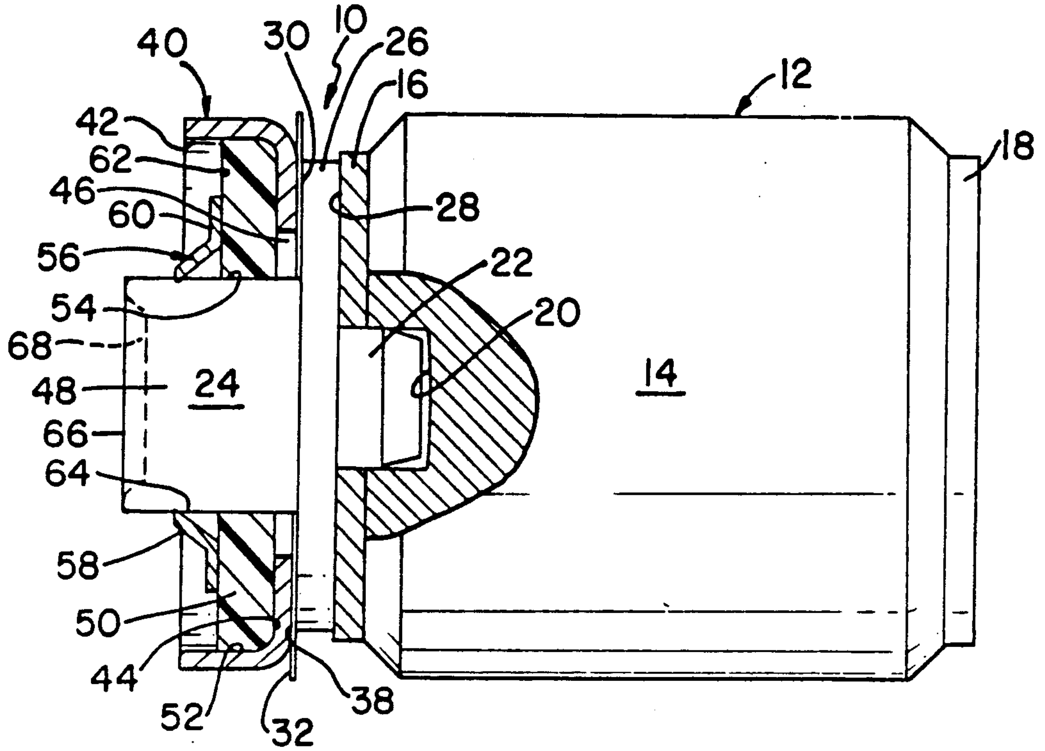
FIG. 1 is an enlarged view partially in cross section of the back-up surge arrester affixed upon a conventional gas filled voltage surge arrester, according to the principles of the present invention.

Referring now to the Figures, and in particular, to FIG. 1, there is shown a back-up surge arrester 10, shown partially in cross-section affixed on a conventional gas filled surge arrester 12 of the conventional type, typical of which is TII-44, manufactured by TII Industries, Inc. of Copiague, N.Y., or part number CB-297, available from General Instrument Corporation, Clare Division of Chicago, Ill. Arrester 12 includes a sealed cylindrical insulating tube 14 preferably composed of a ceramic material within which are situated a pair of normally isolated electrically conductive electrodes 16 and 18 which extend out of both ends thereof. Within the insulated tube 14 electrode 16 and 18 are separated by gas filled space or gap approximately 40 mils in length.

Figure 3:
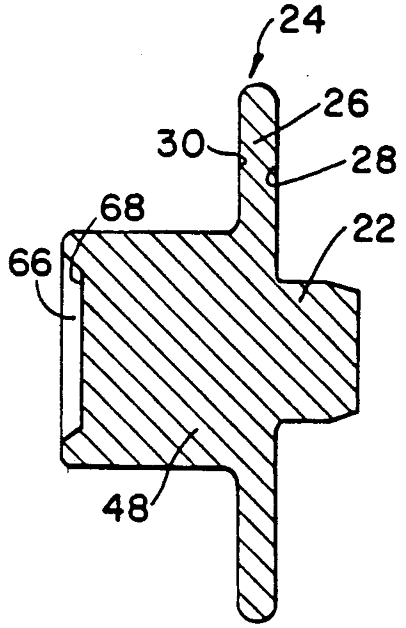
FIG. 3 is a cross sectional view of the rivet shown in FIG. 2 taken along the line 3—3.
Figure 2:
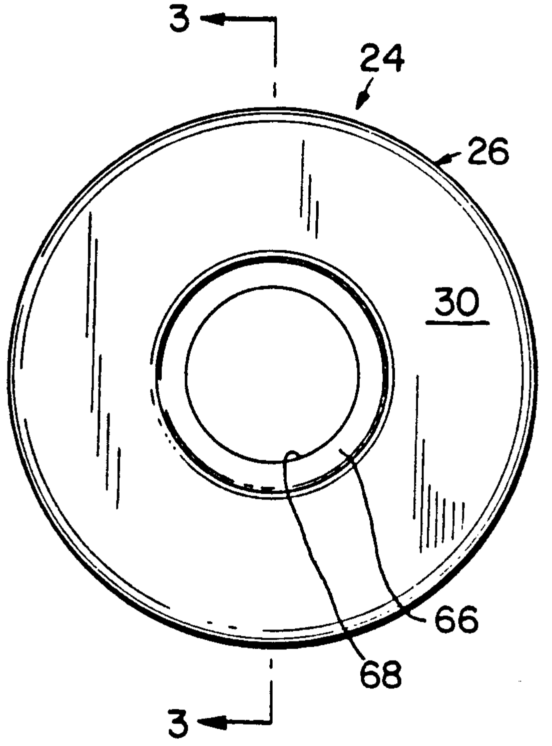
FIG. 2 is a front view of the rivet used in the present invention.
Figure 8:
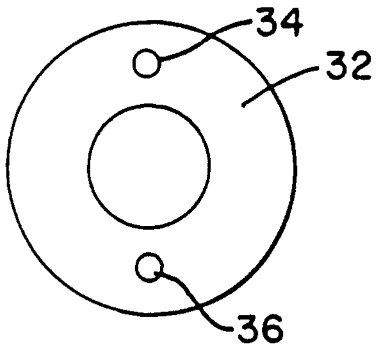
FIG. 8 is a plan view of one insulated washer used in the present invention.

The internal configuration of the gas filled surge arrester 12 is not part of the present invention. However, it is well known that gas filled surge arresters have a variety of different configuration, compositions and electrical characteristics and are commercially available. Generally, at least one of these electrodes (16 in the present invention) is provided with a dimpled recess 20. Dimpled recess 20 is adapted to receive therein an electrically conductive contact, for example, one end 22 of a rivet 24 shown in FIGS. 2 and 3. The rivet 24 remote from end 22 is provided with a flat collar 26 with one surface thereof placed in electrically conductive contact with the electrode 16. This surface 28 may be cemented to electrode 26 with an electrically conductive epoxy adhesive after the back-up surge arrester 12 has been assembled and tested, as will be explained hereinafter. The other surface 30 of collar 26 is generally flat and has thereon a washer 32 generally only 3 mils thick which functions as a insulator. Preferably washer 32 is fabricated from Kapton, manufactured by DuPont of Wilmington, Del., and as is well known, is thermally sensitive and when overheated will breakdown and allow conduction therethrough. The washer 32 is shown in FIG. 8 and may be provided with additional apertures 34 and 36 which as will be observed and explained hereafter, may also function as an additional voltage breakover point. The washer 32 being only approximately 3 mils thick is held in a flat position by the lower flat surface 38 provided by the cupped washer 40 and which includes an extending portion 42 that faces away from the end 22 of the rivet 24. The extendin; portion 42 is generally perpendicular to the upper flat surface 44 of the washer 40. The upper and lower flat surfaces 38 and 44 of the cupped washer 40 is provided with a through aperture 46 which has a diameter that is larger than the diameter of the other end 48 of the rivet 24. A second flat insulator washer 50 is fabricated preferably from PETG, manufactured by Lustro of Evanstown, Ill., and has a circumferential diameter 52 equal to the diameter of the inner cupped washer 40. The aperture 46 provided in the flat portion 44 of the cupped washer 40 has an aperture 54 which has a diameter essentially equal to the diameter of the other end 48 of the rivet 24 so that when the washer 50 is placed over the other end 48 of rivet 44, it will be centered thereon and thus, when inserted into the cupped washer 40 will position the cupped washer so that the through aperture 46 of the cupped washer 40 will be equally spaced and centered about the other end 48 of rivet 24. Preferably, the thickness of washer 50 is approximately 30 mils and provides insulation between the rivet 24 and the cupped washer 40.

Figure 4:
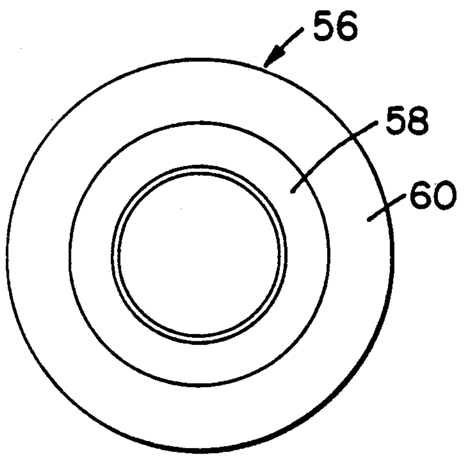
FIG. 4 is a front view of the locking washer used in the present invention.
Figure 5:
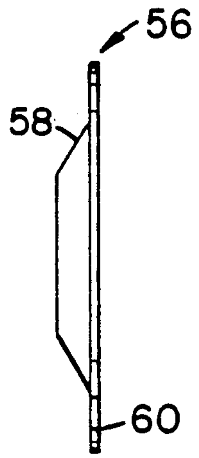
FIG. 5 is an end view in elevation of the washer shown in FIG. 4.

A locking washer 56 shown more clearly in FIGS. 4 and 5 is provided with a tapered portion 58 and a flat portion 60. The flat portion 60 of locking washer 56 is adapted to cooperate with the surface 62 of insulating washer 50 and form a sandwich between the flat portion 60 of the locking washer 56 and the flat portion 44 of the cupped washer 40. The cupped washer 40 is provided with an aperture 64 which is adapted to be received and force fit upon the other end 48 of the rivet 24 and thus urges the assembly toward electrode 16 of the surge arrester 12 forming an additional sandwich of the washer 32 which is held between the surface 28 of the collar 26 of rivet 24 and the lower surface 38 of the flat portion 38 of the cupped washer 40.

The distal end 66 of rivet 24 may be provided with a recess 68 to aid in the assembling of the components of the back-up surge arrester 10. Once assembly has been completed it may be affixed to the electrode 16 of the surge arrester tube 14 by means of a electrically conductive epoxy adhesive such as the type known as Bipax (Part #BA-2916) manufactured by Tra-Con, Inc., of Medford, Mass.

Figure 6:
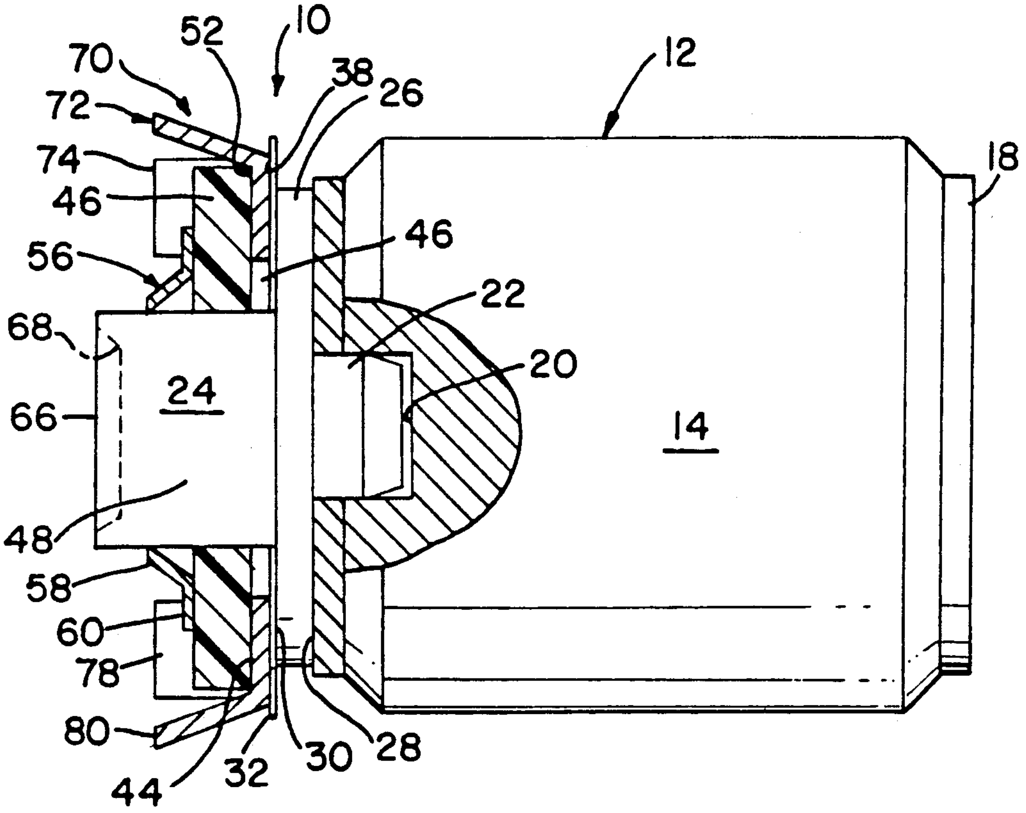
FIG. 6 is a side view in elevation partially in cross-section of an alternative embodiment of the back-up surge arrester of the instant invention affixed upon a conventional gas filled voltage surge arrester.
Figure 7:
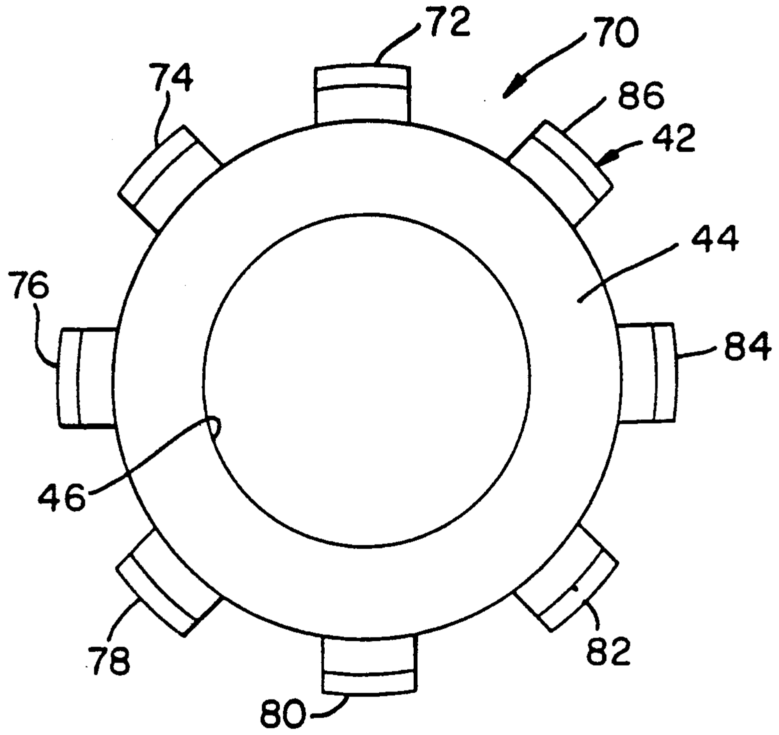
FIG. 7 is a front plan view of the alternative embodiment of the cupped washer.

Referring now to FIG. 6 which is an alternative embodiment of the back-up surge arrester 10 affixed on a gas filled surge arrester tube 14 as shown in FIG. 1. The assembly of the parts with the components as referred to in FIG. 1 is identical to the assembly of parts and configuration shown in FIG. 6. It is to be noted however, that the cupped washer 40 of FIG. 1 is replaced with a cupped washer 70 shown in cross-section in FIG. 6 and a top plan view thereof is shown in FIG. 7.

The cupped washer 70 is provided with a flat portion which includes a lower flat surface 38, an upper flat surface 44 and extending portion 42 that is divided into a plurality of finger-like members 70, 72, 74, 76, 78, 80, 82, 84 and 86 which extend away from flat portion 44 at an angle which may be slightly greater than 90 degrees. The finger-like members 72 through 86 may be flexible and their function will be explained hereafter. The back-up surge arrester once affixed to a conventional gas tube arrester 12 may be inserted into a standard retaining cup, not shown. The cup is composed of an electrically conductive material and has a generally hollow cylindrical shape with a body and head portion well known in the art and is adapted to receive the back-up surge protector 10 and the conventional surge arrester 12 therein. The cupped body portion is adapted to be received into an electrically conductive holder as is well known in the art and is shown in detail in numerous other patents including the one cited above.

In operation, the back-up surge arrester is assembled onto the rivet with jigs and fixtures, not shown. The washer 32 is fitted over the other end 48 of rivet 24 so that it is in contact with the surface 30 of the collar 26 of the rivet 24. Thereafter the cupped washer 40 or washer 70 is placed over the end 48 of rivet the 24 and is centered around the diameter of rivet the 24 by the aid of the insulated washer 50 which is placed over end 48 of the rivet 24. Since the outer diameter of the washer 50 is equal to the diameter of the flat portion of the cupped washer 40 it centers cupped washer 40 around the rivet providing a prescribed air space. The assembly thus far is held in position by the locking washer 56 being placed over end 48 of the rivet 24 urging all the components in a tightly fitting sandwich and is retained in position by friction and may be forcibly inserted thereon, in a conventional manner. Once the assembly has been completed it may be adhered to the electrode 16 of the surge arrester 12 with an electrically conductive epoxy, in a conventional manner.

It is to be noted that electrode 16 is in electrically conductive contact with the rivet 24 which in turn is in contact with the electrically conductive locking washer 56. When the back-up surge arrester and surge arrester assembly is inserted into the receiving cup, not shown, which is electrically conductive it will come into contact with the extending portion 42 of cupped washer 40 or fingers 72 of cupped washer 70 generally being connected to ground, via its receiving assembly, not shown. Thus, electrode 16 and rivet 24 is isolated from ground by the air space provided by through aperture 46 in the flat portion of the cupped washers. Electrode 16 is also isolated from ground by virtue of the Kapton insulator washer 32 which as stated earlier is thermally sensitive so that if the electrode were to become overheated a breakdown would occur through the washer.

Hereinbefore has been disclosed a back-up surge arrester assembly suitable for use with a conventional gas filled surge arrester device capable of providing breakover protection should the gas filled surge arrester loose its seal and be exposed to the atmosphere and in addition, the assembly is capable of providing protection should the electrode of the surge arrester become overheated. It will be understood that various changes in the details, materials, arrangement of parts and operating conditions which have been herein described and illustrated in order to explain the nature of the invention may be made by those skilled in the art within the principles and scope of the instant invention.

Having thus set forth the nature of the invention, what is claimed is:

1. A back-up surge arrester suitable for use with a conventional arrester having at least one electrically conductive electrode provided with a dimpled recess therein, comprising, in combination:

a) elongated rivet means having;
   i) two ends, one end thereof adapted to be received into and being in electrically conductive contact with said one electrode of said surge arrester having said dimpled recess; and
   ii) collar means, disposed remote from said rivet means one end, providing a flat surface circumferentially disposed around said elongated rivet means facing away from said one end;
b) first generally flat insulator means having a centrally disposed aperture with a diameter generally equal to the diameter of said rivet means disposed upon said flat surface of said collar means;
c) cupped washer means having a flat portion and an extending portion disposed generally perpendicular to said washer flat portion, said extending portion facing away from said one end of said rivet means, said washer means flat portion being provided with an aperture having a diameter greater than said rivet means diameter, said washer means flat portion and said arrester dimpled electrode sandwiching said first insulator therebetween;
d) second flat insulator means having a diameter generally equal to the diameter of said cupped washer means flat portion and a centrally disposed aperture with a diameter generally equal to said rivet diameter adapted to be received and cooperate with the flat portion of said cupped washer means; and
e) locking washer means having a tapered portion and a flat portion, said flat portion and said cupped washer means flat portion sandwiching said second insulator therebetween, said locking washer means tapered portion having an aperture adapted to be force fit and frictionally held upon said rivet means second end being in electrically conductive contact with said rivet means, said locking washer means forcing and retaining said first and second insulator means and said cupped washer means against said rivet collar means.

2. A back-up surge arrester according to claim 1 wherein said cupped washer extending portion includes a plurality of finger members.

3. A back-up surge arrester according to claim 1 wherein said first insulator means is approximately 3 mils thick and is heat sensitive.

4. A back-up surge arrester according to claim 3 wherein said first insulator is fabricated from Kapton.

5. A back-up surge arrester according to claim 3 wherein said first insulator means includes at least one additional aperture in addition to said centrally disposed aperture.

6. A back-up surge arrester according to claim 1 wherein said second insulator means is approximately 30 miles thick.

7. A back-up surge arrester according to claim 1 wherein said second insulator is fabricated from PETG.

8. A back-up surge arrester according to claim 1 further including conductive epoxy adhesive means for retaining said back-up air gap surge arrester to said dimpled electrode.

* * * * *